(12) United States Patent
Santos

(10) Patent No.: US 7,870,784 B2
(45) Date of Patent: Jan. 18, 2011

(54) METHOD AND APPARATUS FOR MEASURING WIND VELOCITY

(75) Inventor: Pedro Arsuaga Santos, Madrid (ES)

(73) Assignee: General Electric Company, Schenectady, NY (US)

( * ) Notice: Subject to any disclaimer, the term of this patent is extended or adjusted under 35 U.S.C. 154(b) by 24 days.

(21) Appl. No.: 12/490,125

(22) Filed: Jun. 23, 2009

(65) Prior Publication Data

US 2010/0140953 A1    Jun. 10, 2010

(51) Int. Cl.
*G01F 13/00* (2006.01)
(52) U.S. Cl. .................... 73/170.12; 73/170.07; 290/55
(58) Field of Classification Search .................... None
See application file for complete search history.

(56) References Cited

U.S. PATENT DOCUMENTS

| 4,193,005 | A | 3/1980 | Kos et al. |
| 4,449,400 | A * | 5/1984 | Singh ...................... 73/170.15 |
| 5,390,530 | A * | 2/1995 | Hosonuma et al. ............. 73/40 |
| 5,907,192 | A | 5/1999 | Lyons et al. |
| 6,819,086 | B2 | 11/2004 | Wobben |
| 7,355,294 | B2 | 4/2008 | Teichmann |
| 7,566,981 | B2 | 7/2009 | Kunkel et al. |
| 2005/0005695 | A1* | 1/2005 | Corey et al. .............. 73/170.14 |
| 2009/0134624 | A1 | 5/2009 | Kerber |
| 2009/0218910 | A1* | 9/2009 | Carmein et al. ............. 310/309 |

* cited by examiner

*Primary Examiner*—Andre J Allen
(74) *Attorney, Agent, or Firm*—James McGinness, Esq.; Armstrong Teasdale LLP

(57) ABSTRACT

A sensor assembly for use in measuring wind velocity is described that includes a body that includes at least one surface a flow path defined at least partially by the at least one surface. The sensor assembly further includes a wire extending from the at least one surface, and the wire further extends at least partially through the flow path. The sensor assembly is configured to determine wind velocity when a current is induced to the wire as air flows through the flow path.

13 Claims, 3 Drawing Sheets

METHOD AND APPARATUS FOR MEASURING WIND VELOCITY

BACKGROUND OF THE INVENTION

The present application relates generally to wind turbines and, more particularly, to a method and apparatus for measuring wind velocity.

Wind turbines typically include a plurality of blades that are used to convert kinetic energy from oncoming wind to mechanical energy for use in producing electrical power. To optimize operation of wind turbines, it is often useful or necessary to determine a velocity of oncoming wind.

Accordingly, at least some known wind turbines are equipped with cup-based or cup anemometers that measure wind velocity and a direction of the wind. Known anemometers use a plurality of devices, such as hollow hemispheres, that are rotatably coupled about a vertical rod. When exposed to wind, the plurality of devices rotate about the rod and an electrical device determines the rotational speed of the devices and calculates the wind velocity. The anemometer may also be used in conjunction with a separate vane that determines the wind direction. Accordingly, because such cup anemometers use rotating components, they may be susceptible to mechanical failure. Moreover, because such components must be exposed to the elements to work effectively, such anemometers may be vulnerable to freezing. Furthermore, cup anemometers must be physically taken to a wind tunnel for calibration.

Other known wind turbines may use ultrasonic anemometers to measure wind velocity and direction. Known ultrasonic anemometers use a plurality of transducers that send out ultrasonic pulses from different directions. When exposed to wind, ultrasonic pulses traveling against wind flow are slowed, and ultrasonic pulses traveling with wind flow are accelerated. An electrical device determines a difference in transit time for the pulses sent in different directions, and calculates wind velocity and direction. A disadvantage to using ultrasonic anemometers is that they are expensive. Moreover, ultrasonic anemometers may be adversely affected by other gases or particles contained in wind flow.

BRIEF DESCRIPTION OF THE INVENTION

In one embodiment, a sensor assembly for use in measuring wind velocity includes a body that includes at least one surface and a flow path defined at least partially by the at least one surface. The sensor assembly further includes a wire extending from the at least one surface, and the wire extends at least partially through the flow path. The sensor assembly is configured to determine wind velocity when a current is induced to the wire as air flows through the flow path.

In another embodiment, a wind turbine includes a tower, a nacelle coupled to the tower, a hub coupled to the nacelle, and at least one blade coupled to the hub. The turbine further includes a sensor assembly for use in measuring wind velocity. The sensor assembly includes a body that includes at least one surface and a flow path defined at least partially by the at least one surface. The sensor assembly further includes a wire extending from the at least one surface, and the wire extends at least partially through the flow path. The sensor assembly is configured to determine wind velocity when a current is induced to the wire as air flows through the flow path.

In another embodiment, a method for measuring wind velocity includes providing a body that includes at least one surface and a flow path defined at least partially by the at least one surface. The method further includes coupling a wire to the at least one surface such that the wire extends at least partially through the flow path. The method further includes inducing a current to the wire as air flows through the flow path, and calculating wind velocity based on a resistance variation of the wire.

DETAILED DESCRIPTION OF THE INVENTION

Figure 1:
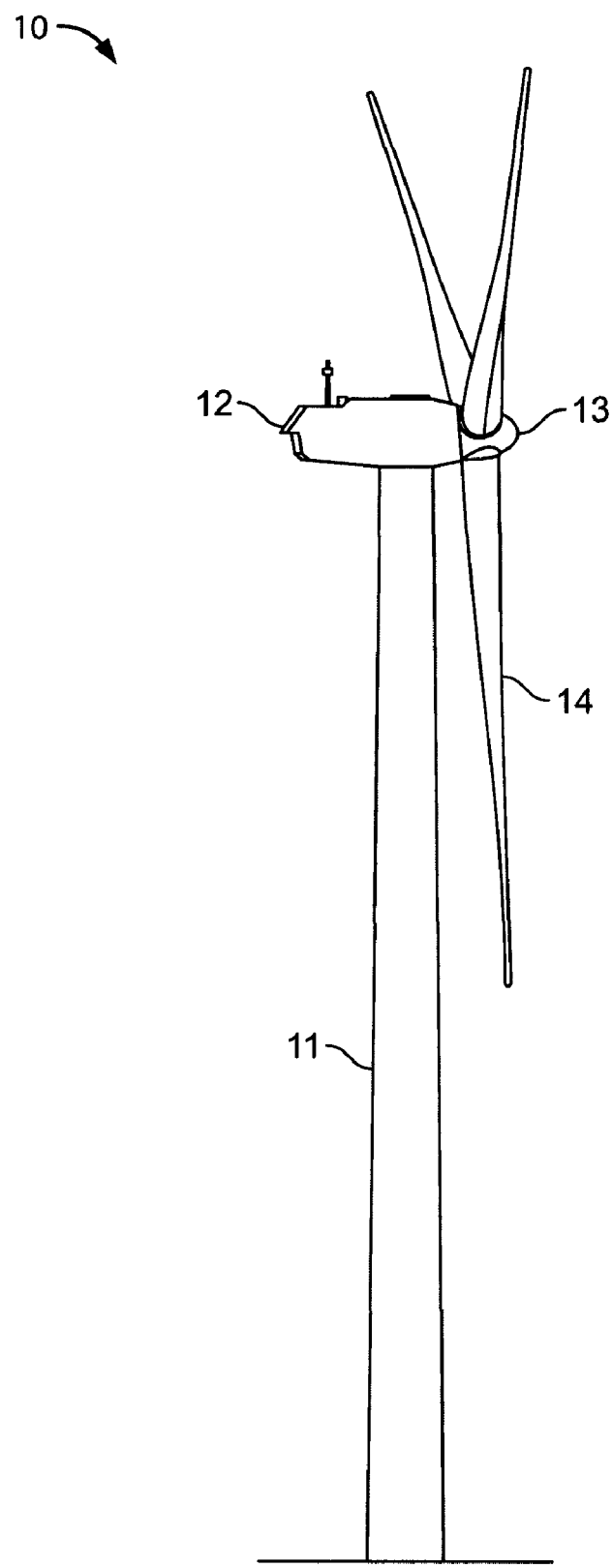
FIG. 1 is a side view of an exemplary wind turbine.

FIG. 1 illustrates an exemplary wind turbine 10. In the exemplary embodiment, wind turbine 10 includes a tower 11, a nacelle 12 that is coupled to tower 11, a hub 13 that is coupled to nacelle 12, and at least one blade 14 that is coupled to hub 13. Tower 11 provides support for nacelle 12, hub 13, and blade 14. Tower 11 may be of such height and construction as is known in the art.

Nacelle 12 is coupled to tower 11. Nacelle 12 typically houses components (not shown) for use in transforming rotational energy of blade 14 into electricity. Nacelle 12 may be constructed as is known in the art. Hub 13 is coupled to nacelle 12. Hub 13 provides a rotatable housing for at least one blade 14. Hub 13 may be constructed as is known in the art.

At least one blade 14 is coupled to hub 13. In the exemplary embodiment, three blades 14 are coupled to hub 13. Blades 14 are rotatable about a centerline axis of rotation when wind strikes blades 14. In the exemplary embodiment, each blade 14 is oriented substantially perpendicularly to the ground, and each blade 14 rotates through substantially the same plane of rotation. Each blade 14 may be constructed as is known in the art.

During operation, as wind strikes blades 14, blades 14 are rotated about hub 13, and the kinetic energy of the wind is transformed into rotational energy by blades 14. More specifically, rotation of blades 14 rotates a gearbox (not shown) within nacelle 12. The gearbox is coupled to a generator (not shown) within nacelle 12 which generates electricity. In an alternative embodiment, wind turbine 10 does not include a gearbox, but rather, the electricity is transmitted via a cable assembly (not shown) extending through tower 11. The cable assembly delivers the electricity to a power grid or other destination.

Figure 2:
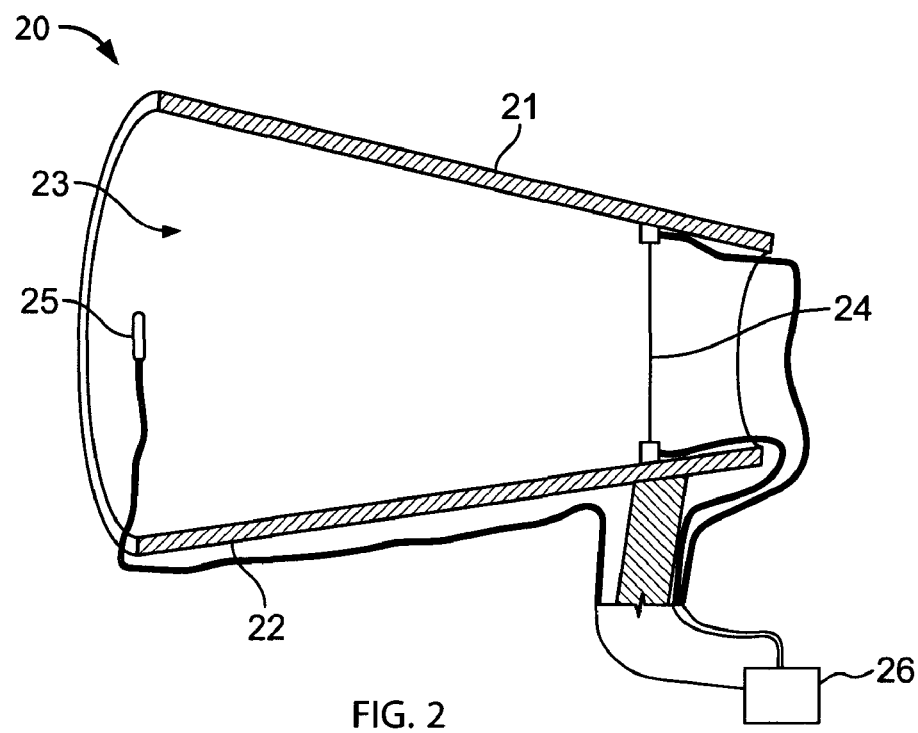
FIG. 2 is a cross-section view of an exemplary sensor assembly that may be used with the wind turbine shown in FIG. 1.

FIG. 2 illustrates an exemplary sensor assembly 20 that may be used with wind turbine 10 (shown in FIG. 1). In the exemplary embodiment, sensor assembly 20 includes a first surface 21, an opposite second surface 22, and a flow path 23 defined therebetween. In the exemplary embodiment, first surface 21 and second surface 22 form substantially complementary halves of a substantially annular body. In an alternative embodiment, first surface 21 is annular and forms a perimeter of flow path 23. In such embodiment, flow path 23 is defined annularly within the perimeter formed by first surface 21, and sensor assembly 20 does not include second surface 22. In the exemplary embodiment, sensor assembly also includes a wire 24 of known resistance that is coupled to first surface 21 and second surface 22, such that wire 24 extends at least partially across flow path 23. In the exemplary embodiment, sensor assembly 20 also includes a temperature sensor 25 that is coupled to either first surface 21 and/or second surface 22, upstream from wire 24. One of ordinary skill in the art will appreciate that the resistance of wire 24 is at least partially dependent upon a temperature of wire 24. Accordingly, as used herein, the term "known resistance" refers to the resistance of wire 24 at a predetermined calibration temperature. One of ordinary skill in the art will further appreciate that sensor assembly 20 may be calibrated on site using the known resistance of wire 24, rather than only calibrating sensor assembly 20 in a wind tunnel.

First surface 21 and second surface 22 may be oriented such that flow path 23 may have any of a variety of cross-sectional areas. For example, flow path 23 may be defined with a substantially conical shape, with a substantially cylindrical shape, with a shape that includes a flared inlet, and/or with any cross-sectional flow area that enables sensor assembly 20 to function as described herein. In the exemplary embodiment, first surface 21 and second surface 22 define a substantially cylindrical flow path 23 that includes a flared inlet. More specifically, in the exemplary embodiment, the shape of flow path 23 facilitates reducing a vertical component of entering air flow, such that substantially only a horizontal component of air flow is sensed by sensor assembly 20. The exemplary embodiment facilitates wind turbine optimization because typically, substantially only the horizontal velocity of wind may be harnessed for wind turbine power generation.

During operation, a substantially constant current is induced to wire 24 from a power source (not shown). Alternatively, a substantially constant voltage may be applied across wire 24. In the exemplary embodiment, the induced current heats wire 24, which reduces a likelihood of ice formation on wire 24. As air enters flow path 23, temperature sensor 25 detects a temperature of the incoming air. As air flows across wire 24, the air causes a temperature decrease in wire 24. In the exemplary embodiment, temperature sensor 25 and wire 24 are each electronically coupled to a data processor 26.

Data processor 26 receives data from wire 24 and from temperature sensor 25. Because the resistance of wire 24 is proportional to the temperature of wire 24, data processor 26 can calculate a velocity of wind flowing through flow path 23 based on the temperature decrease of wire 24, the temperature of the air, and the known resistance value of wire 24. The exemplary embodiment uses a minimum of moving parts to measure wind velocity. As such, it will be appreciated that this embodiment facilitates greater mechanical reliability than cup-based anemometers.

In one embodiment, sensor assembly 20 is coupled to hub 13 using a substantially horizontal beam (not shown). Alternatively, sensor assembly 20 is coupled to hub 13 using any other mechanism (not shown) that allows assembly 20 to function as described herein. In such an embodiment, a rotation of hub 13 may be used to facilitate rotating sensor assembly 20 towards wind flow.

Figure 3:
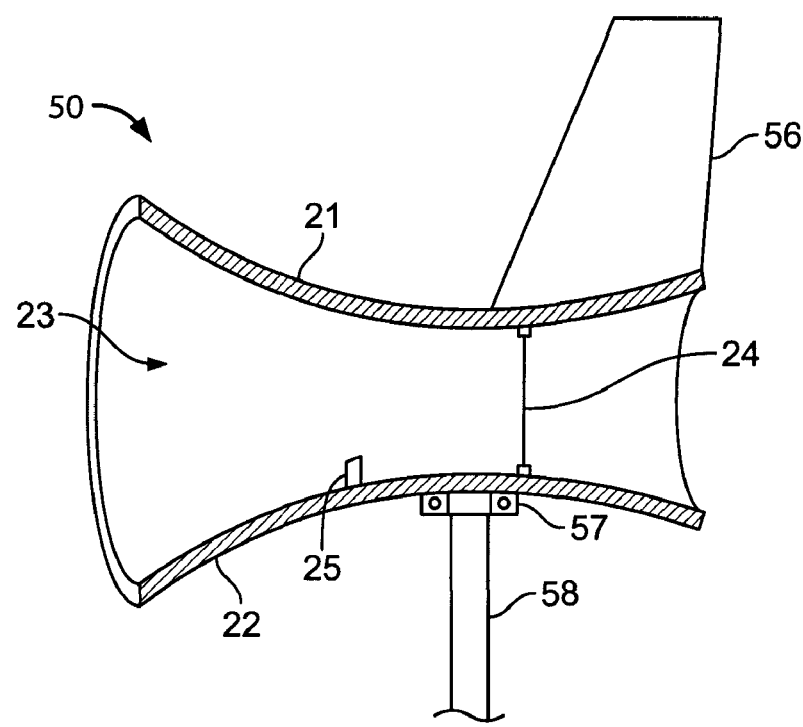
FIG. 3 is a cross-section view of an alternative embodiment of a sensor assembly, including a tail portion and a foot portion, that may be used with the wind turbine shown in FIG. 1.

FIG. 3 illustrates an alternative sensor assembly 50 that may be used with wind turbine 10 (shown in FIG. 1). In such an embodiment, sensor assembly 50 is similar to sensor assembly 20 (shown in FIG. 2) and identical components are identified in FIG. 3 using the same reference numbers used in FIG. 2. As such, sensor assembly 50 includes a flow path 23 and surfaces 21 and 22. Sensor assembly 50 also includes a tail portion 56 and a foot portion 57. Tail portion 56 is oriented such that it induces a horizontal torque to sensor assembly 50 when wind strikes tail portion 56 from any direction except a direction that is substantially parallel to flow path 23. In the exemplary embodiment, tail portion 56 is substantially fin- or vane-shaped, and extends outward from first surface 21 or second surface 22 such that tail portion 56 is aligned substantially parallel to a plane (not shown) extending vertically through a centerline (not shown) of flow path 23.

Foot portion 57 rotatably couples sensor assembly 50 to a shaft 58. In the exemplary embodiment, shaft 58 is oriented substantially perpendicularly to the ground such that sensor assembly 50 is rotatable about a centerline extending through shaft 58. In combination, tail and foot portions 56 and 57, respectively, enable sensor assembly 50 to rotate towards wind flow. In an alternative embodiment, sensor assembly 50 is oriented towards wind flow using sensors or equipment coupled on a device to which sensor assembly 50 is installed. One of ordinary skill in the art will appreciate that tail and foot portions 56 and 57, respectively, facilitate providing a more efficient and cheaper method of measuring both wind velocity and direction than other detection equipment currently available in the art.

Figure 4:
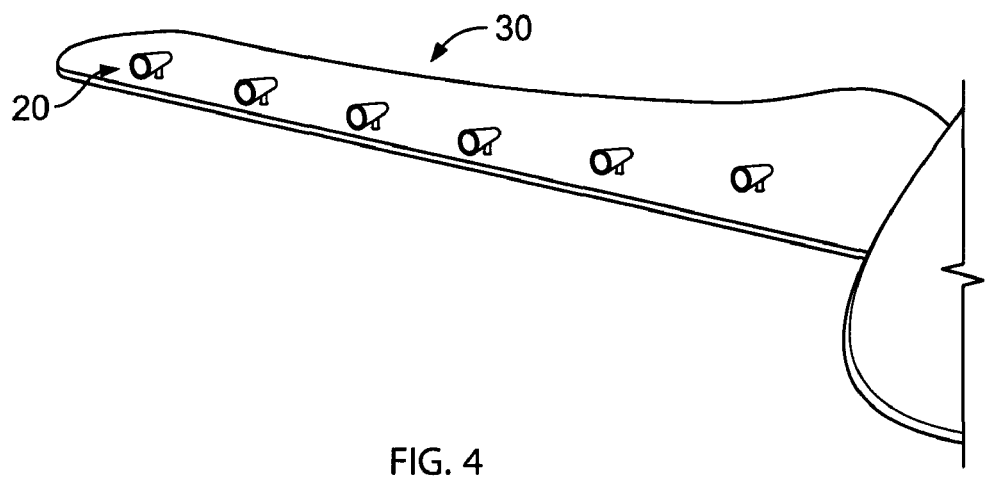
FIG. 4 is a perspective view of a portion of an exemplary airfoil that may be used with the wind turbine shown in FIG. 1 and that illustrates a first mounting arrangement.

FIG. 4 illustrates a portion of an exemplary airfoil 30 that includes a plurality of exemplary sensor assemblies 20 coupled thereto. One of ordinary skill in the art will appreciate that airfoil 30 may be a wind turbine blade, an aircraft wing, a blade used in a gas turbine engine, and/or any other airfoil that falls within the ambit of the subject matter of this application. Sensor assemblies 20 are coupled to airfoil 30 to enable air flowing across airfoil 30 to be analyzed, and may provide a better understanding of wind conditions around airfoil 30. Furthermore, one or more sensor assemblies 20 may be coupled to airfoil 30 to provide data for advanced control of blade pitching. It will be appreciated that sensor assemblies 20 may be readily coupled to or removed from airfoil 30 as needed.

Figure 5:
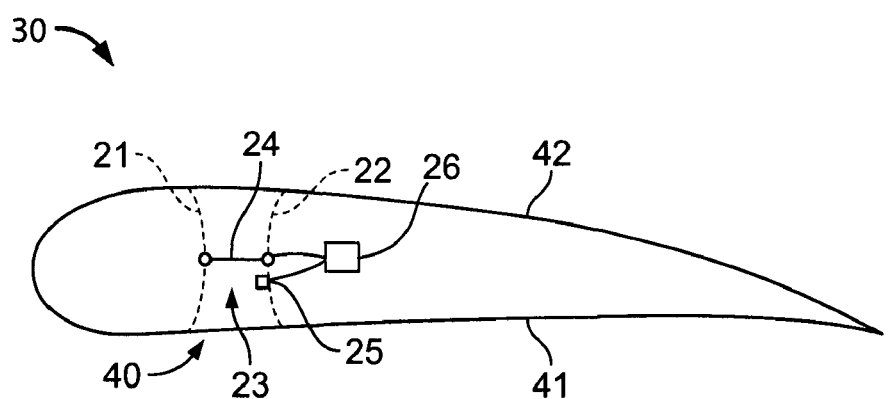
FIG. 5 is a cross-section view of the airfoil shown in FIG. 4 and illustrating a second mounting arrangement.

FIG. 5 illustrates an airfoil 30 that further comprises an opening 40 that extends through airfoil 30 from a pressure side 41 to an opposite suction side 42. Sensor assembly 20 may be coupled to opening 40 to provide data regarding pressure distributions and airflow conditions of airfoil 30.

During operation, high pressure air at pressure side 41 of airfoil 30 enters flow path 23, defined by first surface 21 and second surface 22. Air flows across temperature sensor 25 and wire 24 before exiting flow path 23 at suction side 42 of airfoil 30. Data processor 26 calculates wind velocity based on data from wire 24 and temperature sensor 25.

The above-described embodiments facilitate providing an efficient and cost-effective sensor assembly for measuring wind velocity and direction. The sensor assembly may incorporate a wind-positioning tail and foot portion that orients the sensor assembly substantially towards wind flow. If a wind turbine already includes equipment to orient the turbine towards wind flow, the sensor assembly may alternatively be coupled to the wind turbine without including a foot and tail portion. The embodiments use a minimum of moving parts to measure wind velocity, thereby facilitating greater mechanical reliability than cup-based anemometers. As the embodiments use a heated wire to measure wind velocity, the embodiments reduce the likelihood of ice forming on the measuring surface, thus increasing their ability to be used in cold climates.

Moreover, the exemplary embodiment improves the ability of the sensor assembly to reduce the vertical component of wind flowing through the flow path compared to wind turbines that include cup anemometers. The shape of the sensor assembly body in the exemplary embodiment facilitates measuring substantially only the horizontal component of wind velocity. As shown in the above-described embodiments, the sensor assembly may be coupled to an airfoil, or within an opening in an airfoil, to measure airflow and pressure distributions at the airfoil. Furthermore, the embodiments may be used to measure atmospheric wind flow, as opposed to merely measuring airflow within a lab or a wind tunnel.

Exemplary embodiments of a wind turbine and a method and assemblies for measuring wind velocity are described above in detail. The method and assemblies are not limited to the specific embodiments described herein, but rather, components of assemblies and/or steps of the method may be utilized independently and separately from other components and/or steps described herein. For example, the assemblies may also be used in combination with other measuring systems and methods, and are not limited to practice with only the wind turbine and methods as described herein. Rather, the exemplary embodiment can be implemented and utilized in connection with many other wind turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sensor assembly for use in measuring wind velocity, said sensor assembly comprising:
    a body comprising at least one surface and a flow path defined at least partially by said at least one surface; and,
    a wire extending from said at least one surface such that said wire extends at least partially through said flow path, said sensor assembly is configured to determine wind velocity when a current is induced to said wire as air flows through said flow path.

2. A sensor assembly in accordance with claim 1, wherein said body further comprises a tail portion coupled to said at least one surface, said tail portion facilitates orienting said body relative to air flowing towards said sensor assembly.

3. A sensor assembly in accordance with claim 2, wherein said body further comprises a foot portion that rotatably couples said sensor assembly about an axis of rotation.

4. A sensor assembly in accordance with claim 3, wherein said foot portion is rotatably coupled to a shaft.

5. A sensor assembly in accordance with claim 1, wherein a shape of said flow path facilitates reducing a vertical component of air flow through said body.

6. A sensor assembly in accordance with claim 1, wherein a temperature sensor is coupled to said body.

7. A method for measuring wind velocity, said method comprising:
    providing a body that includes at least one surface and a flow path defined at least partially by the at least one surface;
    coupling a wire to the at least one surface such that the wire extends at least partially through the flow path;
    inducing a current to the wire as air flows through the flow path; and,
    calculating wind velocity of air flowing through the body based on a resistance variation of the wire.

8. A method for measuring wind velocity in accordance with claim 7, wherein said method further comprises coupling a tail portion to the at least one surface, wherein the tail portion facilitates orienting the body relative to air flowing towards the sensor assembly.

9. A method for measuring wind velocity in accordance with claim 8, wherein said method further comprises coupling a foot portion to the body that rotatably couples the sensor assembly about an axis of rotation.

10. A method for measuring wind velocity in accordance with claim 7, wherein said method further comprises coupling the body to an airfoil.

11. A method for measuring wind velocity in accordance with claim 7, wherein said method further comprises coupling the body to an opening defined in an airfoil.

12. A method for measuring wind velocity in accordance with claim 7, wherein said method further comprises providing the at least one surface such that a vertical component of air flow through the flow path is reduced.

13. A method for measuring wind velocity in accordance with claim 7, wherein said method further comprises coupling a temperature sensor to the body.

* * * * *